United States Patent Office 2,885,569
Patented May 5, 1959

2,885,569

GENERATOR CONTROL AND PROTECTIVE SYSTEM

Niles F. Schuh, James R. Reeder, Lewis R. Lowry, Jr., and Ronald E. Hulsey, all of Lima, Ohio, assignors to Westinghouse Electric Corporation, East Pittsburgh, Pa., a corporation of Pennsylvania Application June 11, 1957, Serial No. 664,968

27 Claims. (Cl. 307—87)

The present invention relates to the control and protection of electric generators and, more particularly, to a static system for the control and protection of alternating current generators.

While the system of the present invention is not necessarily restricted in its usefulness to any particular application, it is especially suitable for use with aircraft generators, or in other similar applications where the weight and size must be kept to a minimum and where a high degree of reliability is required.

A control and protective system for alternating current generators must include means for sensing various conditions of the generator, such as voltage, fault conditions, etc., and for effecting control of the generator circuit breaker and field excitation in response to signals derived from the sensing means. In addition, if the generator is to be operated in parallel with other generators, means must be provided for controlling the circuit breaker so that it can be closed only when conditions are correct for connecting the generator to the bus. In the conventional control and protective systems which have been used heretofore on aircraft, electromechanical relays have commonly been used for these purposes, and thermal relays have often been employed to obtain the necessary time delays.

Conventional control panels, consisting of an assembly of such relays, together with the necessary transformers, rectifiers and other components, have necessarily been relatively large and heavy, and have involved a number of difficult problems. The electromechanical relays used in conventional systems must be sensitive relays accurately calibrated as to their operating points, and in many cases the dropout points of the relays must also be accurately determined. Such relays are necessarily quite sensitive, but the accuracy of calibration must be maintained under the severe environmental conditions to which aircraft equipment is subjected. Thus, the calibration must be maintained over a very wide temperature range, which usually requires some type of temperature compensation, and under severe conditions of vibration, mechanical shock and acceleration forces, which requires the use of vibration isolators and shock mountings which increase the size and complication of the system but do not always completely protect the relays under all conditions.

In these conventional systems, it is also sometimes necessary to use alternating current relays, which are relatively large and heavy, as compared to direct current relays, and which require a relatively large amount of power for operation. The sensing circuits, therefore, must include components of sufficient capacity to operate these relays, thus reducing the sensitivity of the sensing circuits and increasing the power loss and the amount of heat to be dissipated, as well as the size and weight of the system. The thermal relays which are often used to obtain time delays also require a relatively large amount of power and are not entirely satisfactory since the time delay obtained varies with variation in the supply voltage, and may be reduced if the relay has not had sufficient cooling time after a previous operation.

Thus, the conventional control and protective systems which have been used heretofore have had many disadvantages, since they are complicated and difficult to build, are undesirably large and heavy, and do not provide as high a degree of reliability as is needed because of the difficulty of maintaining accurate calibration of the relays, as well as the unavoidable wear of moving parts.

The principal object of the present invention is to provide a control and protective system for alternating current generators which can be made very small and compact, but which is highly reliable and which avoids the disadvantages of the conventional systems outlined above.

Another object of the invention is to provide a static control and protective system for alternating current generators which completely eliminates the necessity for accurately calibrated sensitive relays by utilizing static circuits comprising semiconductor devices and other static components of small size and high reliability, thus providing a system which can be made small in size and light in weight but which has greater reliability than the conventional systems heretofore used while eliminating their disadvantages.

A further object of the invention is to provide a static control and protective system for an alternating current generator intended for operation in parallel with other generators which includes all the necessary control and protective means for protecting the generator, and the system to which it is connected, against faults and other abnormal conditions, and which also includes automatic paralleling means for connecting the generator to a bus automatically when the correct conditions exist to permit such connection.

More specifically, there is provided a new type of control and protective system based on a new approach to the problem. In this new system, static circuits are used throughout, eliminating the accurately calibrated relays previously required and making possible the use of miniaturized components of small size and high reliability which are not affected by vibration or mechanical shock, or other adverse environmental conditions. In this system, all sensing and time delay functions are performed at a low power level by static circuits, and the necessary mixing or logic functions are performed on the output signals of the sensing circuits by static logic circuits. Certain of the control functions are performed by static bistable circuits or flip-flops, also at a low power level, and the final output signals of the bistable circuits and logic circuits are amplified to a sufficiently high level to effect operation of the final control devices. In this way, a system is provided which operates almost entirely at a low power level, so that there is little heat to be dissipated, and small, rugged static components are utilized so that the system can be made small and compact but is highly reliable, since it does not depend on accurate calibration of devices involving moving parts, and it is substantially unaffected by environmental conditions so that it is very suitable for aircraft use.

A control and protective system of this kind, utilizing the principles just outlined, is disclosed and claimed in a copending application of J. R. Reeder et al., Serial No. 653,592, filed April 18, 1957. The system of that application is particularly intended for the control of a single generator operating alone. The present control and protective system is somewhat similar but is more particularly intended for the control of a generator intended for operation in parallel with other generators, and thus includes additional control and protective features, as well as a somewhat different manner of operation, although it is based on the same underlying principles as the system of the copending application above referred to.

The invention will be more fully understood from the following detailed description of a typical embodiment, taken in connection with the accompanying drawings, in which.

It will be apparent, as the description proceeds, that the basic principles of the invention can be applied in various ways to meet the requirements of different installations. In order to illustrate the invention, a typical embodiment has been shown in the drawings, which show a complete control and protective system for an alternating current generator intended for operation in parallel with other generators in a multigenerator system, such as is used on large aircraft.

Figure 1:
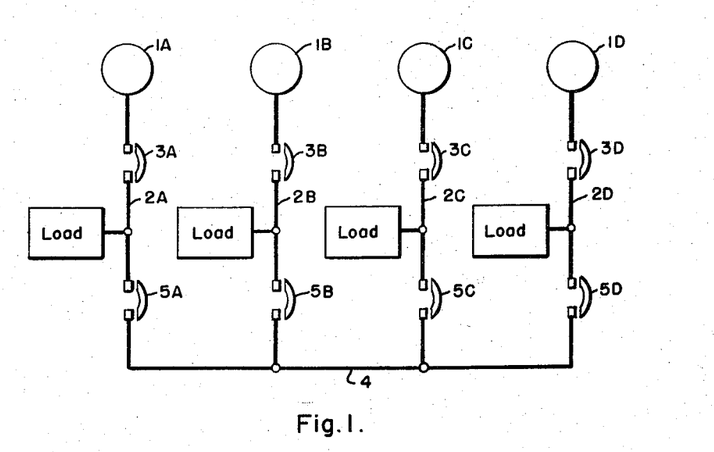
Fig. 1 is a schematic diagram of a typical generator system.

A typical bus arrangement for such systems is shown in the single-line diagram of Fig. 1. As there shown, four alternating current generators 1A, 1B, 1C and 1D are provided. Each generator is connected to a corresponding load bus 2A, 2B, 2C and 2D by means of a generator circuit breaker 3A, 3B, 3C and 3D, respectively. The loads to be supplied by the generators are connected to the various load buses as illustrated. A tie bus or synchronizing bus 4 is also provided and is connected to the various load buses by tie circuit breakers 5A, 5B, 5C and 5D. It will be seen that when all of the circuit breakers 3 and 5 are closed the generators are connected for parallel operation by the tie bus 4 and the loads are supplied in parallel. Any generator can be isolated from the system in case of a fault, or whenever desired, by opening its circuit breaker 3 without interrupting the power supply to the load connected to the corresponding load bus. If desired, however, any generator with its load can be isolated from the rest of the system by opening the corresponding tie breaker 5, and the generator will supply the load connected to its load bus 2 if the generator circuit breaker 3 is closed. Thus, the system is quite flexible in operation. It will be understood, of course, that this particular bus arrangement is only illustrative and that any suitable bus layout might be utilized.

Figure 2:
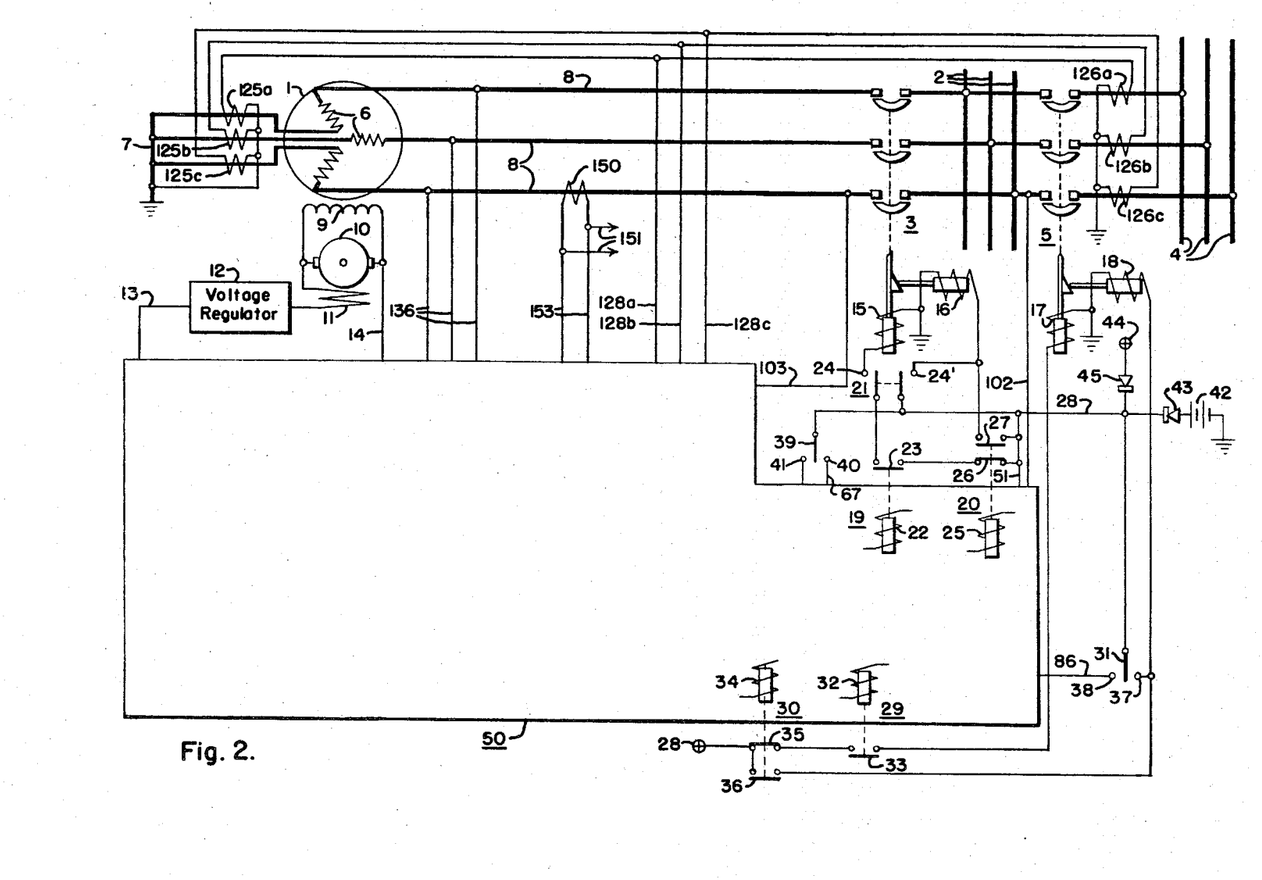
Fig. 2 is a schematic diagram showing the general arrangement of the control means for one generator.
Figure 3A:
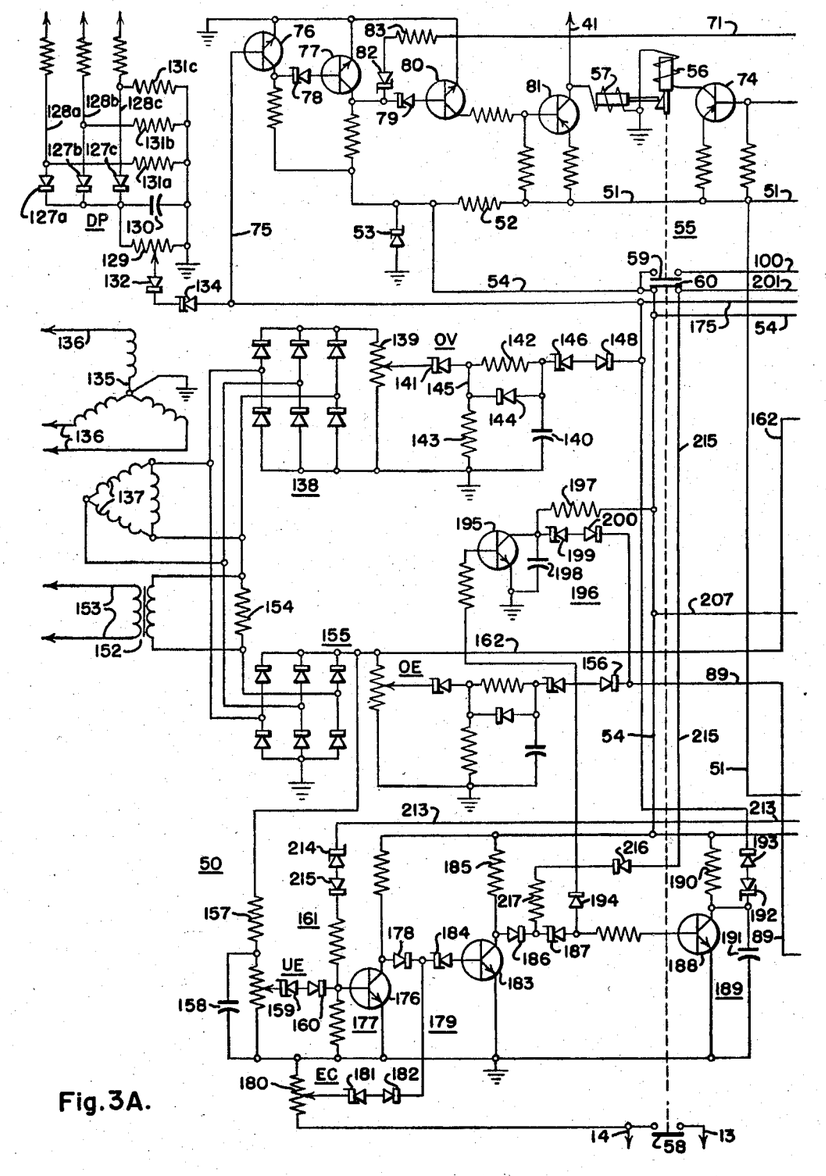
Figs. 3A and 3B, taken together, are a schematic circuit diagram showing the complete control and protective system for one generator.
Figure 3B:
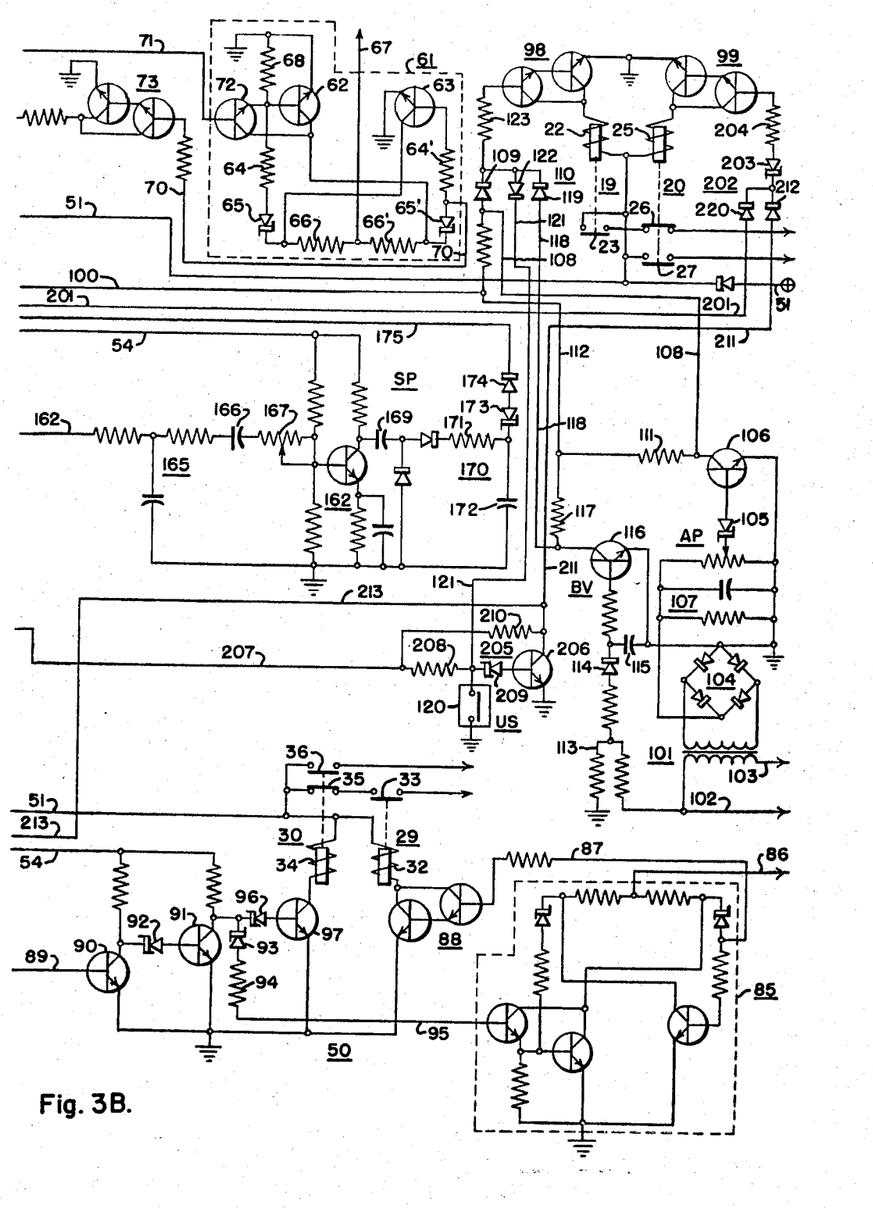
Figure 4:
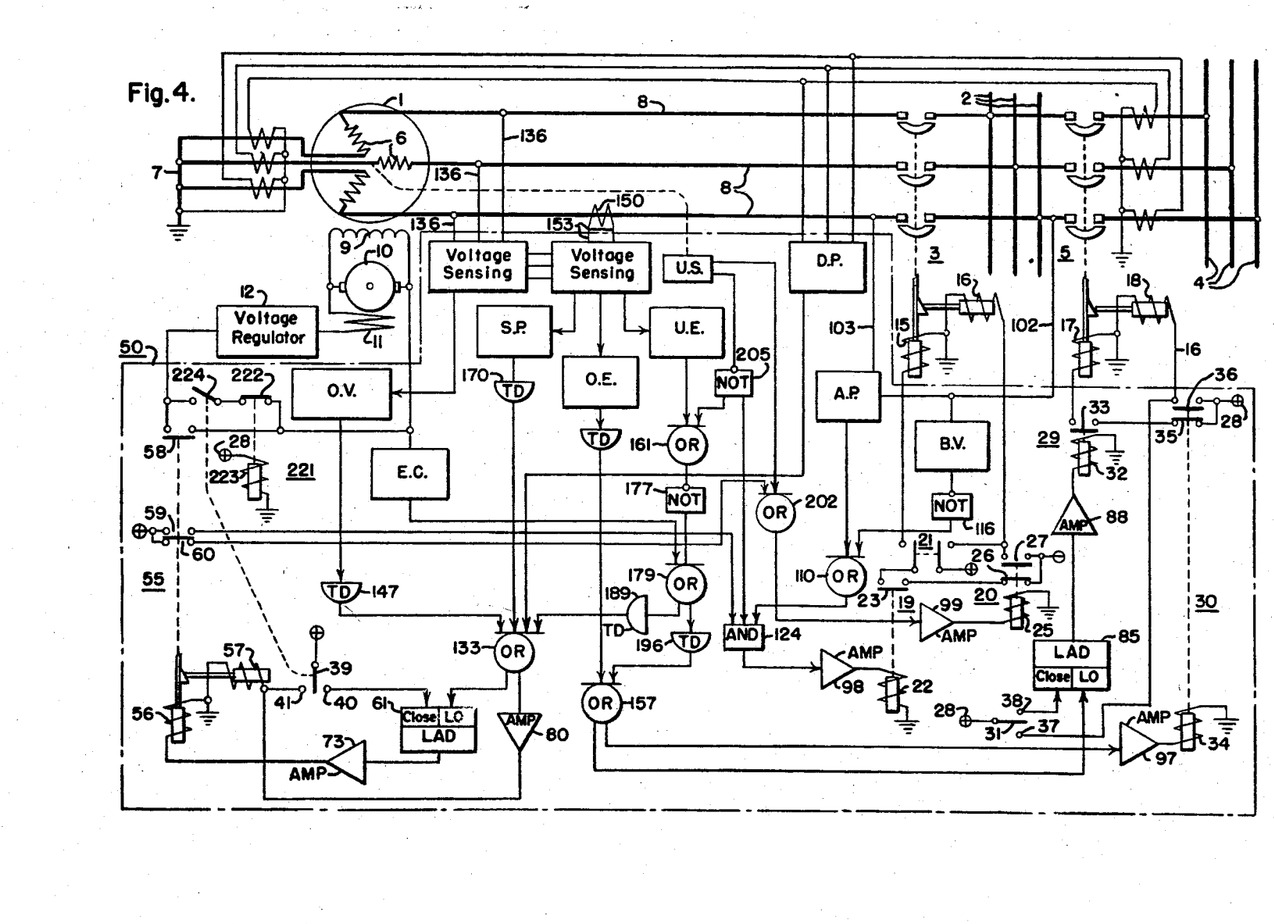
Fig. 4 is a block diagram of the system shown in Figs. 2 and 3.

The control and protective system for each generator is shown in detail in Figs. 2 and 3, and its operation is illustrated by the block diagram of Fig. 4.

The generator 1 is shown in Fig. 2 as a three-phase, alternating current generator having armature windings 6. One end of each of the windings 6 is brought out of the machine to a neutral point 7, and the other ends are connected to leads or feeders 8. The generator 1 has a field winding 9 supplied with direct current excitation from an exciter 10 of any suitable type. The exciter 10 is shown for the purpose of illustration as being a direct current exciter with a self-excited shunt field winding 11. It is to be understood, however, that the exciter 10 represents any suitable type of exciter or excitation system, either rotating or static, and it is preferably provided with a voltage regulator 12 which may be of any suitable type, preferably a static type, and which has not been illustrated in detail since it is not a part of the present invention. The circuit of the exciter field winding 11 or, in general, of the excitation system, is completed through conductors 13 and 14 by means of a field relay as hereinafter described. The generator 1 and exciter 10 may be of any suitable physical construction and may be driven by any suitable prime mover (not shown), such as an airplane engine.

The feeders 8 are connected to the load bus 2 by a generator circuit breaker 3, as previously described. The circuit breaker 3 may be of any suitable type and is shown as being a latch-type breaker having a closing coil 15 and a trip coil 16. The load bus 2 is connected to the tie bus 4, as previously described, by a tie circuit breaker 5 which may also be of any suitable type and which is shown as being a latch-type breaker having a closing coil 17 and a trip coil 18.

The generator circuit breaker 3 is controlled by means of a close pilot relay 19, a trip pilot relay 20, and a two-pole manual switch 21. The relays 19 and 20 may be small rugged relays which do not have to be accurately calibrated since they are required to respond only to on-off signals. The close relay 19 has an operating coil 22 and a normally open contact 23 which is connected to the close coil 15 of the breaker 3 through the contact 24 of the switch 21. The trip relay 20 has an operating coil 25 and has a normally closed contact 26, connected in series with the contact 23 of the relay 19, and a normally open contact 27 connected to the trip coil 16 of the breaker 3. The contacts 26 and 27 of the relay 20 are connected to a direct current conductor 28 to control the energization of the operating coils of the breaker 3 through the switch 21. It will be seen that when the manual switch 21 is placed on the contact 24 the breaker 3 will close when the relay 19 is energized to close its contact 23. When the breaker 3 is closed, it may be tripped by energizing the relay 20 to close its contact 27 which directly energizes the trip coil 16. The breaker 3 may also be tripped at any time by placing the manual switch 21 on the contact 24' which directly energizes the trip coil 16.

The tie circuit breaker 5 is similarly controlled by a close pilot relay 29, a trip pilot relay 30, and a manual switch 31. The close relay 29 has an operating coil 32 and a normally open contact 33 connected to the close coil 17 of the breaker 5. The trip relay 30 has an operating coil 34 and has a normally closed contact 35, connected to the direct current supply and in series with the contact 33 of relay 29, and a normally open contact 36 connected to the direct current supply 28 and to the trip coil 18 of the breaker 5, as shown. The manual switch 31 is connected to the direct current supply 28 and has a contact 37 which is connected to the trip coil 18 to trip the breaker 5 directly. The switch 31 has another contact 38 which is connected to effect control of the close relay 29 as described below. It will be understood that the circuit breakers 3 and 5 may be provided with the conventional auxiliary contacts which deenergize the respective operating coils upon operation of the breaker and which prevent simultaneous energization of both operating coils.

A third manual switch 39 is provided for the control of a field relay to be described later and is connected to the direct current conductor 28. The switch 39 has a reset or close contact 40 and a trip contact 41 connected as hereinafter described.

The switches 21, 31 and 39 may be any suitable type of manually operated switches, preferably of the momentary contact type, and may be mounted at any convenient remote point, such as at the flight engineer's station.

Direct current control power for operation of the circuit breakers and for other purposes, as later described, may be provided in any suitable manner. A direct current supply is indicated diagrammatically by a battery 42 which has its negative terminal connected to ground and its positive terminal connected to the conductor 28 through a blocking rectifier 43. The battery 42 is intended to be representative of any available source of direct current, such as the direct current bus which is normally available on most aircraft. A second source of direct current, indicated diagrammatically at 44, is preferably provided for increased reliability and is connected to the supply conductor 28 through a blocking rectifier 45. The direct current source 44 may be any suitable direct current source, but it is preferably derived from the output of the generator 1 by means of a transformer and rectifier, which have not been shown in the drawing to avoid unnecessary complication.

The static sensing and control circuits for controlling the operation of the circuit breakers 3 and 5 may be mounted on a control and protective panel 50. The panel 50 is indicated diagrammatically in Fig. 2 and the circuits of the control and protective panel are shown in detail in Figs. 3A and 3B.

Direct current control power for energization of the pilot relays and other purposes is provided by a direct current supply conductor 51 on the panel which is connected to the external direct current supply 28. Since this direct current supply may be subject to some variation in voltage, and since a constant supply voltage is required for certain purposes, a regulated direct current supply is also provided on the control panel 50. For this purpose, a voltage regulating circuit is used consisting of a resistor 52 and a semiconductor diode 53 of the type usually referred to as a Zener diode. The resistor 52 and diode 53 are connected in series between the direct current supply conductor 51 and ground.

It will be understood that a Zener diode is a semiconductor device, preferably a silicon diode, which acts as a rectifier to prevent appreciable current flow in the reverse direction when the reverse voltage is below a predetermined breakdown voltage, often called the Zener voltage. When the reverse voltage exceeds this value, the diode breaks down and permits current to flow freely in the reverse direction while the voltage across the diode remains substantially constant. The breakdown is non-destructive, and if the reverse voltage is reduced below the breakdown value, the reverse current is cut off and the device regains its rectifying characteristics. Such a device can obviously be used either as a constant voltage device or as a voltage sensitive device, and these devices are used in the present system for both purposes. The Zener diode 53 is used as a constant voltage device, and its breakdown voltage is made less than the normal voltage of the conductor 51, so that the diode 53 is normally conductive in the reverse direction. A conductor 54 is connected across the diode 53 so that the conductor 54 provides a direct current supply of substantially constant voltage to ground.

The field excitation of the generator 1 is controlled by a field relay 55 which is preferably mounted on the control panel 50, although it could be separately mounted if desired. The relay 55 is shown as being a latch-type relay having a closing coil 56 and a trip coil 57. The field relay 55 has a normally open main contact 58 and also has a normally open contact 59 and a normally closed contact 60. The contact 58 of the field relay 55 is connected between the conductors 13 and 14, as shown, so that when the field relay 55 is closed, the circuit of the exciter field winding 11 is completed and field excitation is applied to the generator 1.

The close coil 56 is controlled by means of a static bistable circuit or flip-flop 61. This circuit may be any suitable type of bistable circuit which has two stable states to provide an on-off, or digital, type of output signal and which has memory characteristics, so that when actuated to either of its stable states, it remains in that state until a signal is applied to cause it to change to the other state. Such a circuit may be described as a latched analog-to-digital converter and may be referred to for convenience as an LAD circuit. Any suitable circuit of this type may be used. The particular circuit shown in the drawing for the purpose of illustration includes transistors 62 and 63 having their bases connected through resistors 64 and 64′ to Zener diodes 65 and 65′, respectively. The Zener diodes are connected through resistors 66 and 66′ to an input conductor 67 which is connected to the close contact 40 of the manual switch 39 (Fig. 2). The emitters of the transistors 62 and 63 are connected to ground and the collector of each transistor is connected to the opposite Zener diode, as shown.

A bias resistor 68 is connected between the base of transistor 62 and ground.

In the operation of this circuit, when a signal is applied to the input conductor 67, the transistor 63 is made conductive because of the biasing action of the resistor 68. This forces transistor 62 to be non-conductive and thus a voltage appears across the resistor 64′ which is applied to the conductor 70 to provide an output signal. The LAD circuit 61 is caused to change state by applying a signal through the conductor 71 to the base of transistor 62, the signal preferably being amplified by a tandem connected transistor 72. When a signal is applied in this way, transistor 62 is made conductive and transistor 63 is driven toward cutoff. As the collector voltage of transistor 63 rises, the feedback network consisting of diode 65 and resistor 64 supplies current to the base of transistor 62, driving it farther into conduction, so that transistor 63 is driven farther toward cutoff. This effect is cumulative so that transistor 62 becomes fully conductive, and transistor 63 becomes fully non-conducting. The voltage applied to diode 65′ is then very low so that it is not broken down and no output voltage appears on the conductor 70. The feedback signal previously mentioned keeps transistor 62 conductive so that the circuit remains in this state and no output signal can occur. Thus, after a signal has been applied through conductor 71, even momentarily, the output signal on conductor 70 is cut off and is locked out since it cannot be reestablished when the signal on conductor 71 is removed. The circuit can be reset only by deenergizing the input conductor 67. Reclosing the switch 39 then reenergizes the circuit 61 and the operation described above may be repeated.

The close coil 56 of the field relay 55 is controlled by the output signal of the LAD circuit 61 through the conductor 70. Since the system is preferably operated at a low power lever, as previously mentioned, the small output signal of the LAD circuit 61 is amplified by a two-stage transistor amplifier 73, and the output of the amplifier 73 is applied to the base of a transistor 74 which controls the close coil 56, the excitation of the coil being obtained from the direct current supply 51, as shown.

The trip coil 57 of the field relay 55 is controlled by a signal supplied to a conductor 75 from the protective circuits to be described hereinafter. Since this signal is also at a low power level, it is amplified by a two-stage amplifier consisting of transistors 76 and 77 coupled through a Zener diode 78. The output of this amplifier is applied through a Zener diode 79 to the base of a transistor 80 which further amplifies the signal and to the base of a transistor 81 which controls the energization of the trip coil 57 from the direct current supply 51, as shown. The output signal from the transistor 77 is also applied through a Zener diode 82 and resistor 83 to the conductor 71 to supply a lockout signal to the LAD circuit 61. The trip coil 57 may also be energized at any time by placing the manual switch 39 on the contact 41, which connects the trip coil directly to the external direct current supply 28.

The pilot relays 29 and 30, which control the tie circuit breaker 5, are controlled in a similar manner. Thus, the close relay 29 is controlled by a static bistable circuit or LAD circuit 85 which is shown as being identical to the LAD circuit 61 previously described. The circuit 85, therefore, will not be described in detail since it is identical to the circuit 61 and operates in the same manner. Thus, when the circuit 85 is energized by placing the external manual switch 31 on its contact 38, an energizing signal is applied to the circuit 85 through the conductor 86, and an output signal appears on the conductor 87. This signal is amplified by the two-stage transistor amplifier 88 which controls the energization of the coil 32 of the relay 29 from the direct current supply 51.

The trip relay 30 is controlled by a signal supplied through a conductor 89 from protective circuits to be described later. This signal is amplified by a two-stage amplifier consisting of transistors 90 and 91 coupled by a Zener diode 92, and the output of the amplifier is applied through a Zener diode 93, a resistor 94 and conductor 95 to the LAD circuit 85 to cause the LAD circuit to change state, thus providing a lockout signal and preventing an output signal from the circuit 85, as previously described in connection with the circuit 61. The output of transistor 91 is also supplied through a Zener diode 96 to the base of a transistor 97 which controls the energization of coil 34 of the trip relay 30 from the direct current supply 51.

The pilot relays 19 and 20, which control the generator circuit breaker 3, are controlled by signals applied in a manner to be described below through two-stage transistor amplifiers 98 and 99, respectively, which control the energization of the coils 22 and 25 of the relays from the direct current supply 51.

The pilot relays and field relay are controlled, to effect operation of the circuit breakers and of the field relay in a desired manner, by means of static sensing and control circuits. Any desired number and type of sensing and control circuits may be utilized to respond to different predetermined conditions of the generator, and the output signals of the sensing circuits are mixed or combined to effect the desired operations by means of static logic circuits. These logic circuits may be of known types including And circuits in which an output signal occurs only when all of a plurality of input signals are present, Or circuits in which an output signal occurs when any one or more of a plurality of input signals are present, and Not circuits in which an output signal occurs only when an input signal is not present. The output signals of the sensing circuits are applied to the logic circuits, and the outputs of the logic circuits, in turn, are used to effect control of the various relays to cause operation of the circuit breakers or field relay, or both, in a desired manner in response to a predetermined condition or combination of conditions of the generator.

Control of the pilot relay 19 to effect closing of the generator circuit breaker 3 is provided by means of an automatic paralleling circuit AP and a bus voltage circuit BV, which operate to permit closing the breaker 3 by the manual switch 21 when conditions are correct to permit connecting the generator 1 to the tie bus 4, if the field relay 55 is closed and the generator is operating at its normal speed.

When the field relay 55 is closed, it closes its contact 58 to complete the excitation circuit for the generator 1 so that field excitation is applied to the generator and it can build up its voltage. At the same time, the contact 59 of the field relay closes and connects the regulated direct current supply 54 to a conductor 100 to supply energizing current to the amplifier 98 under control of the automatic paralleling circuit AP or the bus voltage circuit BV. At the same time, the contact 60 of the field relay 55 is opened.

The automatic paralleling circuit AP may be any type of static circuit which will provide an output signal when the phase relation and frequency difference between the voltage of the generator 1 and the voltage of the bus 4 are within predetermined limits. The particular circuit shown in the drawings for the purpose of illustration is of the type disclosed and claimed in a copending application of H. H. C. Richards, Jr. et al., Serial No. 701,754, filed December 10, 1957. This circuit is energized by a single-phase transformer 101 which has one end of its primary winding connected to the load bus 2 by a conductor 102. The other end of the primary winding is connected to one terminal of the generator 1 by a conductor 103. The primary of the transformer 101 is thus energized by the difference between the bus voltage and the generator voltage, and the transformer output will be at a maximum when these voltages are 180° out of phase and at a minimum when they are in phase. The output of the transformer will also depend on the beat frequency, that is, the difference between the frequencies of the two voltages, and will decrease as the beat frequency decreases.

The output voltage of the secondary winding of the transformer 101 is rectified by a single-phase rectifier bridge 104, and the output of the rectifier is applied through a Zener diode 105 to the base of a transistor 106, a suitable filter circuit 107 also being provided to reduce the ripple and to determine the maximum permissible frequency difference. The collector of the transistor 106 is connected by a conductor 108 to a rectifier 109 which forms part of an Or circuit 110. The collector of transistor 106 is also connected through a resistor 111 to the direct current conductor 100 by a conductor 112. It will be seen that when the frequency difference between the generator voltage and the bus voltage is above a predetermined limit, or when the phase relation is beyond a predetermined limit, the direct current output of the rectifier 104 is high enough to break down the Zener diode 105, so that a signal is applied to transistor 106 to make it conductive. The direct current signal from conductors 100 and 112 is, therefore, shunted to ground through the transistor. When the frequency difference and phase relation are within the predetermined limits, however, the output of the rectifier 104 drops below the breakdown voltage of the diode 105, so that the base signal to transistor 106 is cut off and it becomes non-conducting. The direct current signal from conductor 112 is then applied through conductor 108 to the rectifier 109.

Thus, the automatic paralleling circuit provides an output signal through conductor 108 to the Or circuit 110 when the frequency difference and phase relation between the bus voltage and generator voltage are within the proper limits to permit connecting the generator to the bus. It will be understood that the voltage regulator 12 keeps the generator voltage within narrow predetermined limits, and the system also includes overvoltage and undervoltage protection, as described hereinafter, so that the generator voltage will be maintained within the limits necessary for paralleling. It is only necessary, therefore, for the automatic paralleling circuit AP to give a signal when the phase and frequency of the generator are close enough to synchronism with the bus voltage to permit paralleling.

The bus voltage circuit BV permits the generator breaker 3 to be closed independently of the automatic paralleling circuit when the bus voltage is zero, that is, when no other generator is connected to the bus. The bus voltage circuit BV senses the bus voltage by means of a voltage divider 113 which is connected between the conductor 102 and ground. The voltage taken from the voltage divider 113 is rectified by a half-wave rectifier 114, a filter capacitor 115 preferably being provided to reduce the ripple, and is applied to the base of a transistor 116 which is connected to function as a Not circuit. When the bus 4 is energized, the voltage applied to the transistor 116 makes it conductive, and the direct current signal supplied through conductor 112 and resistor 117 is shunted to ground through the transistor. If the bus voltage is zero, however, there is no base signal applied to the transistor 116, so that it is non-conductive, and a signal from the direct current conductor 112 is supplied through conductor 118 to a rectifier 119 which forms part of the Or circuit 110. Thus, when there is bus voltage, there is no output signal from the bus voltage circuit BV, but if the bus voltage is zero, an output signal appears on conductor 118 which is supplied to the Or circuit 110.

Operation of the pilot relay 19 is also controlled in response to the speed of the generator 1, since the breaker 3 must not be closed unless the generator speed is up to its normal value so that the frequency is within its normal range. For this purpose, an underspeed switch 120 is provided. The underspeed switch 120 may be any suitable type of switch which is controlled in response to the speed of the generator in any desired manner, as by a centrifugal device or other speed responsive means, to open the switch when the generator reaches its normal speed. The switch 120 is closed whenever the generator speed falls below its normal value.

The switch 120 is connected to a conductor 121 and connects the conductor 121 to ground when the switch 120 is closed. The conductor 121 is connected to a rectifier 122 which is connected to the output of the Or circuit 110, so that when the underspeed switch 120 is closed the output signal of the Or circuit 110 is directly connected to ground. When the switch 120 is open, indicating that the generator is running at normal speed, current flow through the conductor 121 is blocked. The output of the Or circuit 110 is then applied through resistor 123 to the transistor amplifier 98 to effect energization of the relay 19, as previously described. Thus, the output of the Or circuit 110 is applied to energize the relay 19 only when the field relay 55 is closed, the generator 1 is up to speed, and a signal is present from either the automatic paralleling circuit AP or the bus voltage circuit BV. In effect, therefore, there is provided an And circuit 124 (Fig. 4), the output of which is applied to the amplifier 98.

It will be seen that in order to close the generator circuit breaker 3 the field relay 55 must first be in closed position and the generator must be up to speed. The relay 19 is then automatically actuated to closed position whenever the conditions are correct for connecting the generator to the bus. That is, if no other generator is connected to the bus, so that the bus voltage is zero, a signal from the bus voltage circuit appears immediately, and the relay 19 closes and remains in closed position. If the bus is energized, no signal appears from the bus voltage circuit, but a signal from the automatic paralleling circuit will occur whenever the relation of the generator voltage and bus voltage is close enough to synchronism to permit paralleling. As the voltages approach and pass through synchronism, the relay 19 closes and may then drop out but recloses as the voltages again approach synchronism. Thus, the breaker 3 can be closed by holding the manual switch 21 on the contact 24, and as soon as the relay 19 closes its contact 23, the breaker 3 will close connecting the generator to the bus. The generators of a multigenerator system, such as that of Fig. 1, can thus be automatically connected to the bus merely by holding their switches 21 closed. The first generator to reach normal speed will be immediately connected to the bus and the remaining generators will be automatically paralleled as the come up to speed.

It is, of course, necessary to provide protection for the generator itself and for the system to which it is connected against faults or other abnormal conditions occurring in the generator and excitation system, and a number of protective circuits are provided for this purpose.

Protection against faults in the generator 1 or on the feeders 8 is provided by means of a fault-sensing or differential protection circuit DP. The fault sensing circuit may be any suitable type of static circuit which provides an output signal in response to internal faults in the generator or faults on the feeders 8. The particular fault-sensing circuit shown is of the type disclosed and claimed in a copending application of N. F. Schuh et al., Serial No. 617,443, filed October 22, 1956. This is a differential protective system utilizing three current transformers 125a, 125b and 125c (Fig. 2) connected in the neutral leads of the generator 1 and three current transformers 126a, 126b and 126c, shown connected in the leads between the circuit breaker 5 and the bus 4, although they might be connected at any desired point. The secondaries of corresponding transformers on opposite sides of the generator are connected together, as shown, the other ends of the respective secondary windings being connected to ground. The current transformers are connected differentially so that under normal conditions, when the currents are the same on opposite sides of the generator, the transformer secondary voltages will be equal and opposite, and no currents flow between them. Upon the occurrence of a fault in the generator, or on one or more of the feeders 8 in the protected zone between the two sets of transformers, the secondary voltages will no longer be equal and circulating currents will flow.

The fault sensing circuit DP itself consists of three rectifiers 127a, 127b and 127c connected, respectively, to the three current transformer circuits by conductors 128a, 128b and 128c. The other sides of the three rectifiers are connected together and to ground through a resistor 129, a filter capacitor 130 preferably also being provided. Three resistors 131a, 131b and 131c are preferably connected between the rectifier leads and ground, as shown, to provide a fixed load on the current transformers. It will be seen that upon the occurrence of a fault a current will flow to ground through one or more of the rectifiers 127a, 127b and 127c, and a voltage will appear across the resistor 129. An adjustable part of this voltage is applied to the conductor 75 through a rectifier 132, which forms part of an Or circuit 133 (Fig. 4), and a Zener diode 134 which determines the minimum fault signal on which operation is desired.

Protection against overvoltage of the generator 1 is provided by an overvoltage circuit OV. The energizing voltage for this circuit is provided by a voltage sensing circuit which includes a three-phase transformer having primary windings 135, which are connected to the generator terminals by leads 136, and having secondary windings 137. The three-phase output of the secondary windings 137 is rectified by a three-phase rectifier bridge 138, so that the output of the rectifier 138 is proportional to the average of the three phase voltages of the generator 1. The output voltage of the rectifier 138 is connected across an adjustable potentiometer 139, and a predetermined portion of the voltage across the potentiometer 139 is utilized to energize the overvoltage circuit OV.

The overvoltage circuit OV may be an inverse time delay, voltage-responsive circuit of any suitable type, and is shown as being of the type disclosed and claimed in a copending application of N. F. Schuh, Serial No. 562,427, filed January 31, 1956. As described in that application, the circuit includes a capacitor 140 connected to the potentiometer 139 through a Zener diode 141 and a resistor 142, so that the capacitor is charged by the voltage of the potentiometer 139 when it exceeds the breakdown voltage of the diode 141. An auxiliary discharge circuit for the capacitor 140 is also provided consisting of a resistor 143 and a rectifier 144 connected across the capacitor 140. A biasing connection 145 is provided between the resistor 143 and the diode 141. The diode 141 is selected to have a breakdown voltage corresponding to the generator voltage at which operation is desired, the operating point being adjustable by means of the potentiometer 139.

Under normal voltage conditions, only an extremely small leakage current flows through the diode 141, and the discharge circuit 143—144 prevents any charge from building up on the capacitor 140. If the generator voltage exceeds the maximum permissible value, the diode 141 breaks down and permits the capacitor 140 to charge at a rate determined by the value of the resistor 142 and the magnitude of the applied voltage, the rectifier 144 being biased in the reverse direction through the connection 145 so that the charge of the capacitor cannot leak off through the auxiliary discharge circuit. The voltage of the capacitor 140 is applied to a Zener diode 146. The time required for the capacitor voltage to reach the breakdown voltage of the diode 146 gives the time delay necessary to prevent operation on transient overvoltages, as indicated at 147 in Fig. 4 and since the charging rate of the capacitor is a function of the magnitude of the voltage, the desired inverse time delay characteristic is obtained. When the diode 146 breaks down, an output signal from the circuit OV is applied through a rectifier 148, which forms part of the Or circuit 133, to the conductor 75.

Protection against excitation faults and against loss of stability is also provided. Any suitable static circuits which will provide output signals in response to the occurrence of these conditions may be utilized. In the preferred embodiment shown in the drawings, stability protection is provided by a circuit SP, overexcitation protection is provided by a circuit OE, and underexcitation protection is provided by a circuit UE.

For proper protection against any of these conditions when the generator 1 is operating in parallel with other generators in a multigenerator system, it is necessary to provide means for selecting the faulted generator so that it will be removed from the system while the good generators will not be affected. The voltage sensing means for the protective circuits therefore includes means for obtaining the necessary selectivity. For this purpose, a current transformer 150 (Fig. 2) is connected in one output lead of the generator 1. The current transformer 150 is connected in a loop circuit with corresponding transformers connected to the other generators of the system, as indicated by conductors 151 in Fig. 2. A saturating current transformer 152 (Fig. 3A) is connected to this loop circuit by conductors 153, and the output of the transformer 152 is applied to a resistor 154.

The voltage across the resistor 154 is utilized to obtain the desired selectivity, under conditions where the reactive loads of the paralleled generators become unbalanced, in the manner more fully described and claimed in a copending application of J. R. Reeder et al., Serial No. 726,131, filed April 3, 1958.

The voltage to which the protective circuits SP, OE and UE respond is obtained from a three-phase rectifier bridge 155 connected to the transformer secondary windings 137, in parallel with the rectifier bridge 138 previously mentioned, and the resistor 154 is connected in series in the proper phase of the input to the rectifier bridge 155. It can be shown, as more fully explained in the above-mentioned application, that when an overexcitation fault occurs in the excitation system of the generator 1, so that the generator tends to take more than its share of the reactive load current, the resistor 154 adds a bias voltage in a direction to raise the output voltage of the rectifier bridge 155, while on a fault causing underexcitation of the generator, a bias voltage is added in the opposite direction which lowers the output voltage of the rectifier bridge 155. This action is due to the reactive components of the load current circulating in the loop circuit 151 when the reactive currents of the respective generators become unbalanced. In the good generators operating in parallel, the phase relation of the voltage of the bias resistors 154 to the generator voltage is opposite to that described, and the outputs of the corresponding rectifier bridges 155 in the control systems of the good generators are changed in the opposite direction to that indicated above.

The overexcitation circuit OE is a voltage responsive, inverse time delay circuit and is shown as being identical to the overvoltage circuit OV previously described. The overexcitation circuit OE, therefore, will not be described in detail since its operation is identical to that of the OV circuit. The overexcitation circuit OE is connected to the rectifier 155, and when an overexcitation fault occurs, the overexcitation circuit provides an output voltage, after a time delay which varies inversely with the voltage. The output voltage of the circuit OE is applied through a rectifier 156, which forms part of an Or circuit 157 to the conductor 89 to effect operation of the pilot relay 30, as previously described. As explained above, on an overexcitation fault, the resistor 154 adds a bias voltage which raises the output voltage of the rectifier 155 sufficiently to insure operation of the circuit OE, while the corresponding resistors of the good generators add bias voltages which reduce the voltages applied to their overexcitation circuits sufficiently to prevent operation.

The underexcitation sensing circuit UE includes a potentiometer 157 connected across the output of the rectifier bridge 155, a filter capacitor 158 preferably being provided to reduce the ripple. An adjustable voltage from the potentiometer 157 is applied to a Zener diode 159. Under normal conditions, this voltage is high enough to exceed the breakdown voltage of the diode 159, so that an output signal is obtained under normal conditions and is applied to a rectifier 160 which forms part of an Or circuit 161. In case of an underexcitation fault, when the output voltage of the rectifier 155 drops, the voltage falls below the breakdown value of the diode 159 and the output signal is interrupted. As explained above, the resistor 154 provides a bias voltage on an underexcitation fault which lowers the output voltage of the rectifier 155 to insure the desired operation. The corresponding bias voltages of the good generators operating in parallel raise the voltages of their rectifiers so that their UE circuits do not operate. The output signal of the UE circuit is used to control a time delay circuit, described hereinafter, which supplies a signal to the OR circuit 133.

The underexcitation circuit UE also provides undervoltage protection when the generator 1 is being operated alone, that is, isolated from the system by opening the tie breaker 5. When this is done, the secondary of the current transformer 150 should be short-circuited to remove it from the loop circuit 151, so that no output is obtained from the transformer 152, and the underexcitation circuit UE responds directly to the generator voltage to provide undervoltage protection. The current transformer 150 may be short-circuited in any suitable manner, preferably by auxiliary contacts on the breaker 5 which close when the breaker opens and which have not been shown to avoid undue complication of the drawings.

The stability protection circuit SP is also energized by the output voltage of the rectifier bridge 155 through a conductor 162. In case of loss of stability of the generator 1, such as may be caused by falling out of synchronism with the other generators of the system for any reason, oscillations or swings of the generator output voltage occur which appear as a modulation of the output voltage of the rectifier 155, that is, regular oscillations in magnitude of this voltage. Load instability due to oscillation of the reactive load between different generators of the system may also occur. This also causes modulation of the output voltage of the rectifier 155 of the generator causing the instability since the bias voltage of the resistor 154 of the faulty generator adds to the rectifier output voltage, as described above, providing selectivity on load instability. Thus, either voltage or reactive load oscillations cause a modulation of the output voltage of the rectifier 155.

Any suitable type of static circuit may be utilized to detect modulation of predetermined frequency and magnitude in the output voltage of the rectifier 155, and to provide an output signal after a predetermined time delay which prevents operation on transient swings such as may be caused by load switching. The particular circuit shown is of the type disclosed and claimed in a copending application of R. E. Hulsey et al., Serial No. 730,693, filed April 24, 1958. This circuit includes a filter 165 which is designed to pass the predetermined range of modulation frequencies but not the normal ripple in the output voltage of the rectifier 155. A blocking capacitor 166 is provided to block the flow of direct current. The minimum magnitude of voltage modulation for operation of the circuit is determined by an adjustable resistor 167. The output of the filter is applied to a transistor amplifier 168, and the output of the amplifier is coupled by a capacity 169 to a time delay circuit 170 which includes a resistor 171 and a capacitor 172. The capacitor 172 is charged by the positive peaks of the output of the amplifier 168, and in effect integrates the positive peaks. When the voltage of the capacitor 172 reaches the breakdown voltage of a Zener diode 173, after a time delay which varies inversely with the magnitude of the voltage modulation, the diode 173 breaks down and an output signal is applied to a rectifier 174, which forms part of the Or circuit 133 and through conductor 175 to the conductor 75.

As previously indicated, the output signal of the underexcitation circuit UE, which is present under normal conditions, also controls a signal to the Or circuit 133. The output signal of the underexcitation circuit UE is applied to the Or circuit 161 previously mentioned, and the output of the Or circuit is applied to the base of a transistor 176 which is connected as a Not circuit 177. The collector of the transistor 176 is connected through a resistor to the direct current conductor 54 and the emitter is grounded. The transistor 176 is normally conductive, because of the signal applied to its base from the Or circuit 161 under normal conditions, so that the direct current supply is shunted to ground and there is no output signal from the Not circuit 177. Upon interruption of the signal from the Or circuit, the transistor 176 is made non-conductive, and an output voltage appears at the collector which is applied to a rectifier 178 which forms part of an Or circuit 179.

An exciter ceiling voltage protective circuit EC is also provided. This circuit consists of a potentiometer 180 connected between the excitation circuit 14 and ground, so that the voltage across the potentiometer is proportional to the exciter voltage. An adjustable portion of this voltage is applied to a Zener diode 181. In case of a regulator fault, or other fault, which causes the exciter voltage to rise to its ceiling value, the Zener diode 181 is broken down, and a signal voltage is applied to the rectifier 182 which forms part of the Or circuit 179.

Thus, in case of either underexcitation or an exciter ceiling voltage condition, a signal is applied from the Or circuit 179 to the base of a transistor 183 through a Zener diode 184. Under normal conditions, the transistor 183 has no signal applied to its base and is, therefore, non-conductive. The collector of transistor 183 is connected to the direct current supply 54 through a resistor 185, and since the transistor 183 is non-conducting under normal conditions, an output voltage is normally present at the collector which is applied through a rectifier 186 and a Zener diode 187 to the base of a transistor 188 which controls a time delay circuit 189.

The time delay circuit 189 includes a resistor 190 and capacitor 191 connected in series to the direct current supply 54. The transistor 188 is connected across the capacitor 191, and as long as a voltage is applied to the base of the transistor, making it conductive, the capacitor 191 is effectively short-circuited and prevented from charging. When the signal to the base of transistor 188 is interrupted, by the occurrence of an underexcitation condition of an exciter ceiling voltage condition, the transistor 188 becomes non-conductive and the capacitor 191 charges through resistor 190. The capacitor voltage is applied to a Zener diode 192, and when the capacitor voltage reaches the breakdown value of diode 192, after a predetermined time delay, the diode breaks down and a signal voltage is applied to the rectifier 193, which forms part of the Or circuit 133, and thus to conductor 75.

The output signal from the transistor 183, which controls the time delay circuit 189, is also applied through a rectifier 194 to the base of a transistor 195 which controls another time delay circuit 196. The time delay circuit 196 includes a resistor 197 and capacitor 198 which are connected in series to the direct current supply 54 and the transistor 195 is connected across the capacitor 198. The transistor 195 is maintained conductive under normal conditions, by the voltage signal from transistor 183, and the capacitor 198 is thus short-circuited. Upon interruption of the output signal from transistor 183, however, the transistor 195 becomes non-conductive, and capacitor 198 charges through resistor 197. The voltage of capacitor 198 is applied to a Zener diode 199 which breaks down when the capacitor voltage reaches the breakdown value of the diode after a predetermined time delay, and a signal is thus supplied to rectifier 200 which forms part of the Or circuit 157.

The Or circuit 157 receives a signal from either the overexcitation circuit OE through rectifier 156, as previously described, or from the time delay circuit 196 through rectifier 200. The Or circuit 157 is connected to the conductor 89 to supply a signal for effecting operation of the pilot relay 30, as previously described.

The field relay 55 is tripped through the Or circuit 133 in response to signals from any one or more of the differential protection circuit DP, the overvoltage circuit OV, the stability protection circuit SP, and the time delay circuit 189 which is controlled by the underexcitation circuit UE and the exciter ceiling voltage circuit EC. The Or circuit 133 supplies a signal to conductor 75 which is amplified and effects energization of the trip coil 57 as previously described.

When the field relay 55 is tripped, it opens its contact 58 to interrupt the exciter field circuit and remove excitation from the generator 1. At the same time, it closes its contact 60 which connects the direct current supply 54 to a conductor 201. The conductor 201 is connected to a rectifier 220 which forms part of an Or circuit 202. The Or circuit 202 is connected through a Zener diode 203 and a resistor 204 to the amplifier 99 which energizes the coil 25 of the pilot relay 20 to effect tripping of the generator circuit breaker 3. Thus, whenever the field relay is tripped, the generator breaker 3 is also tripped.

The generator breaker 3 is also directly tripped by decrease in speed of the generator 1 below its normal value, by means of the underspeed switch 120. As previously described, the switch 120 is open when the generator is running at normal speed and closes when the generator speed drops. The switch 120 is connected to control a Not circuit 205. The Not circuit 205 includes a transistor 206 which has its base connected to the direct current supply 54 by a conductor 207, through a resistor 208 and a Zener diode 209. The collector of transistor 206 is also connected to the conductor 207 through a resistor 210 and the emitter is connected to ground. The switch 120 is connected to the Zener diode 209, as shown.

When the generator is running at normal speed and the switch 120 is open, the direct current voltage is applied to the base of transistor 206 through the diode 209 so that the transistor is conductive, and no output signal is obtained from the Not circuit, as the resistor 210 is grounded through the transistor. It will also be noted that when switch 120 is open, the direct current supply voltage is applied through conductor 121 to bias rectifier 122 in the reverse direction to permit operation of the pilot relay 19 as previously described.

When the generator slows down, and the switch 120 closes, the direct current supply is grounded through resistor 208, and the Zener diode 209 cuts off the signal to the base of the transistor 206. The transistor thus becomes non-conductive, and the direct current supply voltage is applied through resistor 210 to a conductor 211 which is connected to a rectifier 212 which forms part of the Or circuit 202. Thus, whenever the generator slows down below its normal speed and the switch 120 closes, a signal is applied directly to the Or circuit 202 to effect tripping of the generator circuit breaker 3.

At the same time, a signal is supplied from the Not circuit 205 through a conductor 213 and Zener diode 214 to a rectifier 215 which forms part of the Or circuit 161. The purpose of this signal is to prevent tripping of the field relay 55 on a normal shutdown of the generator. On a normal shutdown, both the speed and the voltage of the generator will decrease, and the signal from the underexcitation circuit UE will be interrupted. At the same time, however, a signal will be supplied from the Not circuit 205 to the Or circuit 161, and thus to the Not circuit 177, to prevent operation of the time delay circuit 189, so that the field relay 55 is not tripped, although the generator circuit breaker 3 is tripped by operation of the underspeed switch, as described above.

The operation of this control and protective system should now be apparent. The operation is controlled by the manual switches 21, 31 and 39. If it is desired to start the generator 1 and connect it to the bus, the bus tie breaker 5 should first be closed and the field relay 55 must be closed to apply field excitation to the generator. If a normal shutdown has previously occurred, the tie breaker 5 and the field relay 55 will both be closed. If either of these is open, however, the tie breaker is closed by placing the manual switch 31 on contact 38 and the field relay is closed by placing the switch 39 on contact 40. The LAD circuits 61 and 85 are thus energized and effect closing of the field relay 55 and breaker 5, respectively, as previously described. When the generator comes up to normal speed, switch 120 closes, and the generator is connected to the bus by holding the manual switch 21 on its contact 24. As previously described, the breaker 3 is then closed automatically when the correct conditions exist, by energization of the pilot relay 19 by either the automatic paralleling circuit AP or the bus voltage circuit BV. The system is then in its normal operating condition.

When the generator is shut down in the normal manner, by shutdown of its prime mover, the breaker 3 is tripped but the field relay and tie breaker 5 are not tripped. The generator is thus ready to build up its voltage immediately upon starting the prime mover and is automatically reconnected to the bus, as described, when the manual switch 21 is operated. The breakers 3 and 5 and field relay can be manually tripped at any time by means of their respective switches 21, 31 and 39.

If a fault occurs in the generator or on one or more of the feeders 8 during operation, an instantaneous signal is applied from the differential protection circuit DP to the Or circuit 133. If an overvoltage condition or either voltage or load instability occurs, signals are applied to the Or circuit 133, after a time delay, from the respective overvoltage and stability protection circuits OV and SP. The signal from the Or circuit 133 causes the field relay 55 to be tripped to remove excitation from the generator, and the generator circuit breaker 3 is tripped upon tripping of the field relay, as described above, to disconnect the generator from the bus. In case of an excitation fault which causes either underexcitation of the generator or an exciter ceiling voltage condition, the underexcitation circuit UE or exciter ceiling circuit EC operates to cause a signal to be applied to the Or circuit 133 from the time delay circuit 189, after a predetermined time delay, and a signal is also applied after a time delay from the circuit 196 to the Or circuit 157. Under these conditions, therefore, the tie breaker 5 is also tripped, in addition to the field relay and breaker 3, and the generator is thus isolated to protect the system and the connected loads from damage due to the excitation fault.

In case of an excitation fault which causes overexcitation, the overexcitation circuit OE supplies a signal through the Or circuit 157 to trip the tie breaker 5. In this case, the field relay 55 and generator breaker 3 are not tripped unless the overexcitation also causes sufficient overvoltage to operate the overvoltage circuit OV.

In case of any of the above-mentioned fault conditions which cause tripping of the field relay 55, a lockout signal is also applied from the Or circuit 133 through conductor 71 to the LAD circuit 61 which causes it to change state and prevents a closing signal being supplied to the field relay. Thus, the LAD circuit 61 provides a positive lockout action since after a trip signal has occurred, the field relay cannot be reclosed without first deenergizing the LAD circuit and then again manually placing the switch 39 on the contact 40. This lockout action prevents cycling of the system since after the field relay has been tripped by a fault signal it cannot reclose even if the switch 39 is held on contact 40, and the field relay cannot be closed during a fault since the fault signal keeps the LAD circuit in the lockout state even if the switch 39 is placed on contact 40 while a fault exists. Thus positive lockout of the field relay under fault conditions is obtained without requiring additional circuitry or mechanical lockout relays.

The LAD circuit 85 provides a similar lockout action in the same way after tripping of the tie breaker 5. When a trip signal is applied from the Or circuit 157, a lockout signal is also supplied to the LAD circuit 85 through conductor 95 which causes the circuit 85 to change state so that the tie breaker 5 cannot be cycled by holding the switch 31 on the contact 38, the effect being the same as described above in connection with the LAD circuit 61.

When the field relay 55 is tripped, it closes its contact 60, as previously mentioned, to effect tripping of the generator circuit breaker 3. The contact 60 also connects the direct current supply 54 to a conductor 215 which is connected through a rectifier 216 and resistor 217 to the Zener diode 187. Thus, when the field relay has been tripped by a signal from the time delay circuit 189, a signal is applied through conductor 215 to the base of transistor 188 to make it conductive and permit the capacitor 191 to discharge. This interrupts the signal from the time delay circuit 189 which would otherwise continue and prevent reclosing the field relay even after the fault had ceased to exist.

It may occasionally happen that no direct current control power is available, for some reason, when it is desired to start the generator. If the field relay 55 is open, there would be no way to close it to permit the generator to build up its voltage. If it is desired to provide for this condition, this may be done in a simple manner illustrated only in Fig. 4 to avoid undue complication of the other figures. As there shown, a relay 221 is provided having a normally closed contact 222 and an operating coil 223. The coil 223 is connected to the direct current supply conductor 28 so that the relay is energized and the contact 222 is open when the normal direct current supply voltage is present. The field relay switch 39 is provided with a second pole 224 which is connected in series with the relay contact 222 across the field relay contact 58.

When the switch 39 is moved to the close contact 40, the switch pole 224 also closes and, if the relay contact 222 is closed, a bypass circuit is completed around the contact 58, completing the exciter field circuit. The generator 1 thus has field excitation and can build up its voltage. If direct current control power is supplied at 44 from a transformer-rectifier unit connected to the generator, direct current power is available as soon as the generator builds up its voltage and the field relay will close its contact 58 while the contact 222 will open. The switch 224 can then be released.

It will now be apparent that a control and protective system has been provided for alternating current generators which has many advantages. The system is completely static, permitting the use of rugged components of small size and high reliability, so that a small, compact system is obtained which is relatively unaffected by environmental conditions and which has much greater reliability than was obtainable with the relay systems previously used. No accurately calibrated sensitive relays are required since all sensing and control functions are performed by static circuits, and the problems of maintaining accurate calibration are thus eliminated. The pilot relays and field relay respond only to on-off signals and thus do not need to be accurately calibrated so that small, rugged relays of high reliability can be used. The sensing and control functions are performed at a low power level so that there is no serious problem of heat dissipation and relatively little power is utilized in the system. The new system is also very flexible in application since sensing circuits of various types responsive to different conditions can readily be added to the system, or circuits that may not be needed in a particular case can be omitted, to effect operation of the system in any desired manner in response to predetermined conditions.

A specific embodiment of the invention has been shown and described for the purpose of illustration, but it will be apparent that the invention is not limited to the specific arrangement shown, or to the specific details of the various circuits described, since the illustrated embodiment represents only one of the various forms of embodiment possible within the scope of the invention.

We claim as our invention:

1. A control and protective system for an alternating current generator having a field winding, said system comprising field relay means for controlling the energization of said field winding, switch means for connecting the generator to a bus, static circuit means for controlling said switch means to connect the generator to the bus for operation in parallel with other generators, static sensing circuits for providing signal voltages in response to predetermined conditions of the generator, and static means controlled by said signal voltages for effecting operation of the field relay means and the switch means in a predetermined manner.

2. A control and protective system for an alternating current generator having a field winding, said system comprising field relay means for controlling the energization of said field winding, switch means for connecting the generator to a bus, static circuit means operative when the field relay means is in position for energizing the field winding and the generator speed is above a predetermined value to effect operation of said switch means to connect the generator to the bus for operation in parallel with other generators, static sensing circuits for providing signal voltages in response to predetermined conditions of the generator, and static means controlled by said signal voltages for effecting operation of the field relay means and the switch means in a predetermined manner.

3. A control and protective system for an alternating current generator having a field winding, said system comprising field relay means for controlling the energization of said field winding, switch means for connecting the generator to a bus, static circuit means for controlling said switch means to connect the generator to the bus for operation in parallel with other generators, static sensing circuits for providing signal voltages in response to predetermined electrical conditions of the generator, static means controlled by said signal voltages for effecting operation of the field relay means and the switch means in a predetermined manner, and means for effecting operation of the switch means to disconnect the generator from the bus when the generator speed falls below a predetermined value.

4. A control and protective system for an alternating current generator having a field winding, said system comprising field relay means for controlling the energization of said field winding, switch means for connecting the generator to a bus, static circuit means operative when the field relay means is in position for energizing the field winding and the generator speed is above a predetermined value to effect operation of said switch means for connecting the generator to the bus for operation in parallel with other generators, static sensing circuits for providing signal voltages in response to predetermined electrical conditions of the generator, static means controlled by said signal voltages for effecting operation of the field relay means and the switch means in a predetermined manner, and means for effecting operation of the switch means to disconnect the generator from the bus when the generator speed falls below a predetermined value.

5. A control and protective system for an alternating current generator having a field winding, said system comprising field relay means for controlling the energization of said field winding, switch means for connecting the generator to a bus for operation in parallel with other generators, static circuit means responsive to the phase relation and frequency difference between the generator voltage and the bus voltage for effecting closing of the switch means when said phase relation and frequency difference are within predetermined limits, and static circuit means responsive to the bus voltage for effecting closing of the switch means independently of the first-mentioned static circuit means when the bus voltage is zero.

6. A control and protective system for an alternating current generator having a field winding, said system comprising field relay means for controlling the energization of said field winding, switch means for connecting the generator to a bus for operation in parallel with other generators, static circuit means responsive to the phase relation and frequency difference between the generator voltage and the bus voltage for effecting closing of the switch means when said phase relation and frequency difference are within predetermined limits, static circuit means responsive to the bus voltage for effecting closing of the switch means independently of the first-mentioned static circuit means when the bus voltage is zero, and means for preventing operation of either of said static circuit means to effect closing of the switch means when the generator speed is below a predetermined value.

7. A control and protective system for an alternating current generator having a field winding, said system comprising field relay means for controlling the energization of said field winding, switch means for connecting the generator to a bus for operation in parallel with other generators, and static circuit means operative when the field relay means is in position for energizing the field winding and the generator speed is above a predetermined value for controlling said switch means, said static circuit means including means responsive to the phase relation and frequency difference between the generator voltage and bus voltage for effecting closing of the switch means when said phase relation and frequency difference are within predetermined limits and means responsive to the bus voltage for effecting closing of the switch means independently of the first-mentioned means when the bus voltage is zero.

8. A control and protective system for an alternating current generator having a field winding, said system comprising field relay means for controlling the energization of said field winding, switch means for connecting the generator to a bus for operation in parallel with other generators, static circuit means for controlling said switch means, said static circuit means including means responsive to the phase relation and frequency difference between the generator voltage and bus voltage for effecting closing of the switch means when said phase relation and frequency difference are within predetermined limits and means responsive to the bus voltage for effecting closing of the switch means independently of the first-mentioned means when the bus voltage is zero, means for energizing said static circuit means to effect operation of the switch means when the field relay means is in position for energizing the field winding, and means for preventing operation of the static circuit means to effect closing of the switch means when the generator speed is below a predetermined value.

9. A control and protective system for an alternating current generator having a field winding, said system comprising field relay means for controlling the energization of said field winding, switch means for connecting the generator to a bus, static sensing circuits for providing signal voltages in response to predetermined conditions of the generator, and static circuit means controlled by said signal voltages for effecting operation of the field relay means to effect deenergization of the generator field winding and operation of the switch means to disconnect the generator from the bus.

10. A control and protective system for an alternating current generator having a field winding, said system comprising field relay means for controlling the energization of said field winding, switch means for connecting the generator to a bus, static sensing circuits for providing signal voltages in response to predetermined conditions of the generator, static circuit means controlled by said signal voltages for effecting operation of the field relay means to effect deenergization of the generator field winding, and means responsive to said operation of the field relay means for effecting operation of the switch means to disconnect the generator from the bus.

11. A control and protective system for an alternating current generator having a field winding, said system comprising field relay means for controlling the energization of said field winding, switch means for connecting the generator to a bus, static sensing circuits for providing signal voltages in response to predetermined conditions of the generator, static circuit means controlled by said signal voltages for effecting operation of the field relay means to effect deenergization of the generator field winding and operation of the switch means to disconnect the generator from the bus, and means for effecting operation of the switch means to disconnect the generator from the bus when the speed of the generator falls below a predetermined value.

12. A control and protective system for an alternating current generator having a field winding, said system comprising field relay means for controlling the energization of said field winding, switch means for connecting the generator to a bus, static sensing circuits for providing signal voltages in response to predetermined conditions of the generator, static control circuit means for controlling the field relay means, means for energizing the control circuit means to effect actuation of the field relay means to effect energization of the generator field winding, and circuit means responsive to said signal voltages for actuating the field relay means to effect deenergization of the field winding and for energizing the control circuit means in a manner to prevent actuation of the field relay means to energize the field winding.

13. A control and protective system for an alternating current generator having a field winding, said system comprising field relay means for controlling the energization of said field winding, switch means for controlling the generator to a bus, static sensing circuits for providing signal voltages in response to predetermined conditions of the generator, static bistable circuit means for controlling the field relay means, said bistable circuit means having a stable state in which an output signal is provided to effect actuation of the field relay means to effect energization of the generator field winding, and circuit means responsive to said signal voltages for actuating the field relay means to effect deenergization of the field winding and for changing said bistable circuit means to a second stable state in which the provision of said output signal is prevented.

14. In a control circuit for a circuit-controlling device, static bistable circuit means having a first stable state in which an output signal is provided to effect actuation of said device to one position, and means for effecting actuation of said device to another position and for changing the bistable circuit means to a second stable state in which the provision of said output signal is prevented.

15. In a control circuit for a circuit-controlling device, static bistable circuit means having a first stable state in which an output signal occurs and a second stable state in which occurrence of the output signal is prevented, means for energizing the bistable circuit means in said first state, means for applying the output signal to effect actuation of said device to one position, and means for effecting actuation of the device to another position and for causing the bistable circuit means to change to said second state, the bistable circuit means being adapted to remain in the second state until it is deenergized.

16. A control and protective system for an alternating current generator having a field winding, said system comprising field relay means for controlling the energization of said field winding, switch means for connecting the generator to a bus, means for actuating the field relay means to a first position to effect energization of the generator field winding, static circuit means for effecting actuation of the field relay means to a second position to effect deenergization of the field winding in response to predetermined conditions of the generator, means for effecting operation of the switch means to disconnect the generator from the bus upon actuation of the field relay to said second position, and means for effecting operation of the switch means to disconnect the generator from the bus when the generator speed falls below a predetermined value.

17. A control and protective system for an alternating current generator having a field winding, said system comprising field relay means for controlling the energization of said field winding, switch means for connecting the generator to a bus, means for actuating the field relay means to a first position to effect energization of the generator field winding, static circuit means for effecting actuation of the field relay means to a second position to effect deenergization of the field winding in response to predetermined conditions of the generator, one of said predetermined conditions being generator voltage below a normal value, means for effecting operation of the switch means to disconnect the generator from the bus upon actuation of the field relay to said second position, and means for effecting operation of the switch means to disconnect the generator from the bus when the generator speed falls below a predetermined value and for preventing actuation of the field relay means to its second position in response to generator voltage below said normal value.

18. A control and protective system for an alternating current generator having a field winding, said system comprising field relay means for controlling the energization of said field winding, switch means for connecting the generator to a bus, means for actuating the field relay means to a first position to effect energization of the generator field winding, static sensing circuits for providing signal voltages in response to predetermined conditions of the generator, one of said sensing circuits being an undervoltage circuit adapted to provide a signal voltage when the generator voltage falls below a normal value, static circuit means controlled by said signal voltages for effecting actuation of the field relay means to a second position to effect deenergization of the generator field winding, means for effecting operation of the switch means to disconnect the generator from the bus, means for actuating said switch-operating means in response to actuation of the field relay means to said second position, and means responsive to the speed of the generator for effecting actuation of the switch-operating means and preventing the occurrence of a signal voltage from said undervoltage circuit when the generator speed falls below a predetermined value.

19. A control and protective system for an alternating current generator having a field winding and an excitation system for energizing the field winding, said control and protective system comprising field relay means for controlling the energization of said field winding, first switch means for connecting the generator to a load bus, second switch means for connecting the load bus to a tie bus for operation of the generator in parallel with other generators, means for effecting operation of said second switch means to closed position, and static control circuit means operative when the field relay means is in position to effect energization of the generator field winding and the generator speed is above a predetermined value for effecting operation of said first switch means to closed position when correct conditions for connecting the generator to the tie bus exist.

20. A control and protective system for an alternating current generator having a field winding and an excitation system for energizing the field winding, said control and protective system comprising field relay means for controlling the energization of said field winding, first switch means for connecting the generator to a load bus, second switch means for connecting the load bus to a tie bus for operation of the generator in parallel with other generators, means for effecting operation of said second switch means to closed position, and static control circuit means operative when the field relay means is in position to effect energization of the generator field winding and the generator speed is above a predetermined value for controlling the operation of said second switch means, said control circuit means including means responsive to the phase relation and frequency difference between the generator voltage and the tie bus voltage for effecting closing of the second switch means when said phase relation and frequency difference are within predetermined limits and means responsive to the tie bus voltage for effecting closing of the second switch means independently of the last-mentioned means when the tie bus voltage is zero.

21. A control and protective system for an alternating current generator having a field winding and an excitation system for energizing the field winding, said control and protective system comprising field relay means for controlling the energization of said field winding, first switch means for connecting the generator to a load bus, second switch means for connecting the load bus to a tie bus for operation of the generator in parallel with other generators, means for effecting operation of said second switch means to closed position, static control circuit means operative when the field relay means is in position to effect energization of the generator field winding and the generator speed is above a predetermined value for effecting operation of said first switch means to closed position when correct conditions for connecting the generator to the tie bus exist, static sensing circuits for providing signal voltages in response to predetermined conditions of the generator, and circuit means controlled by said signal voltages for effecting operation of the field relay means and of the first switch means in a predetermined manner.

22. A control and protective system for an alternating current generator having a field winding and an excitation system for energizing the field winding, said control and protective system comprising field relay means for controlling the energization of said field winding, first switch means for connecting the generator to a load bus, second switch means for connecting the load bus to a tie bus for operation of the generator in parallel with other generators, means for effecting operation of said second switch means to closed position, and static control circuit means operative when the field relay means is in position to effect energization of the generator field winding and the generator speed is above a predetermined value for effecting operation of said first switch means to closed position when correct conditions for connecting the generator to the tie bus exist, static sensing circuits for providing signal voltages in response to predetermined electrical conditions of the generator, circuit means controlled by said signal voltages for effecting operation of the field relay means to effect deenergization of the generator field winding, means responsive to said operation of the field relay means for effecting operation of the first switch means to open position, and means for effecting operation of the first switch means to open position when the generator speed falls below a predetermined value.

23. A control and protective system for an alternating current generator having a field winding and an excitation system for energizing the field winding, said control and protective system comprising field relay means for controlling the energization of said field winding, first switch means for connecting the generator to a load bus, second switch means for connecting the load bus to a tie bus for operation of the generator in parallel with other generators, means for effecting operation of said second switch means to closed position, and static control circuit means operative when the field relay means is in position to effect energization of the generator field winding and the generator speed is above a predetermined value for effecting operation of said first switch means to closed position when correct conditions for connecting the generator to the tie bus exist, static sensing circuits for providing signal voltages in response to predetermined electrical conditions of the generator, circuit means controlled by said signal voltages for effecting operation of the field relay means to effect deenergization of the generator field winding, means responsive to said operation of the field relay means for effecting operation of the first switch means to open position, static sensing circuits for providing signal voltages in response to conditions indicating faulty operation of the generator excitation system, and circuit means controlled by the last-mentioned signal voltages for effecting operation of the second switch means to open position.

24. A control and protective system for an alternating current generator having a field winding and an excitation system for energizing the field winding, said control and protective system comprising field relay means for controlling the energization of said field winding, first switch means for connecting the generator to a load bus, second switch means for connecting the load bus to a tie bus for operation of the generator in parallel with other generators, means for effecting operation of said second switch means to closed position, and static control circuit means operative when the field relay means is in position to effect energization of the generator field winding and the generator speed is above a predetermined value for effecting operation of said first switch means to closed position when correct conditions for connecting the generator to the tie bus exist, static circuit means responsive to predetermined electrical conditions of the generator for effecting operation of the field relay means to effect deenergization of the generator field winding, other static circuit means responsive to underexcitation of the generator and to excessive excitation system voltage for effecting operation of the second switch means to open position and operation of the field relay means to effect deenergization of the generator field winding, means responsive to operation of the field relay means to field-deenergizing position for effecting operation of the first switch means to open position, and additional static circuit means responsive to overexcitation of the generator for effecting operation of the second switch means to open position.

25. A control and protective system for an alternating current generator having a field winding and an excitation system for energizing the field winding, said control and protective system comprising field relay means for controlling the energization of said field winding, first switch means for connecting the generator to a load bus, second switch means for connecting the load bus to a tie bus for operation of the generator in parallel with other generators, means for effecting operation of said second switch means to closed position, and static control circuit means operative when the field relay means is in position to effect energization of the generator field winding and the generator speed is above a predetermined value for effecting operation of said first switch means to closed position when correct conditions for connecting the generator to the tie bus exist, static circuit means responsive to predetermined electrical conditions of the generator for effecting operation of the field relay means to effect deenergization of the generator field winding, other static circuit means responsive to underexcitation of the generator and to excessive excitation system voltage for effecting operation of the second switch means to open position and operation of the field relay means to effect deenergization of the generator field winding, means responsive to operation of the field relay means to field-deenergizing position for effecting operation of the first switch means to open position, additional static circuit means responsive to overexcitation of the generator for effecting operation of the second switch means to open position, and means responsive to the speed of the generator for effecting operation of the first switch means when the generator speed falls below a predetermined value.

26. A control and protective system for an alternating current generator having a field winding, said system comprising field relay means for controlling the energization of said field winding, switch means for connecting the generator to a bus, means for effecting operation of said field relay means to effect energization of the field winding, static circuit means for effecting operation of the switch means to closed position, static sensing circuits for providing signal voltages in response to predetermined conditions of the generator, and static means controlled by said signal voltages for effecting operation of the field relay means and of the switch means in a predetermined manner.

27. A control and protective system for an alternating current generator having a field winding, said system comprising field relay means for controlling the energization of said field winding, switch means for connecting the generator to a bus, means for effecting operation of said field relay means to effect energization of the field winding, static circuit means for effecting operation of the switch means to closed position, static sensing circuits for providing signal voltages in response to predetermined conditions of the generator, control means for effecting operation of the field relay means to effect deenergization of the field winding, control means for effecting operation of the switch means to open position, and static circuit means for applying said signal voltages to said control means to effect operation of the field relay means and of the switch means in a predetermined manner.

References Cited in the file of this patent

UNITED STATES PATENTS

| | | |
|---|---|---|
| 1,729,699 | Bang | Oct. 1, 1929 |
| 2,075,666 | Seeley | Mar. 30, 1937 |
| 2,675,491 | Milne | Apr. 13, 1954 |
| 2,777,075 | Mognihan | Jan. 8, 1957 |